United States Patent [19]

Simmonds, Jr.

[11] Patent Number: 4,623,589

[45] Date of Patent: Nov. 18, 1986

[54] PARTICULATE POLYMERIC MATERIALS AND METHODS FOR USING PARTICULATE POLYMERIC MATERIALS

[75] Inventor: Robert C. Simmonds, Jr., Boxford, Mass.

[73] Assignee: USM Corporation, Flemington, N.J.

[21] Appl. No.: 699,683

[22] Filed: Feb. 13, 1985

[51] Int. Cl.$^4$ ............................................. B32B 27/32
[52] U.S. Cl. .................................... 428/403; 264/123; 264/126; 264/127; 428/405; 428/407; 524/904; 427/180
[58] Field of Search ..................... 428/403, 405, 407; 264/127, 123, 126; 524/904; 427/180

[56] References Cited

U.S. PATENT DOCUMENTS

| | | | |
|---|---|---|---|
| 4,027,067 | 5/1977 | Wagner et al. | 524/904 |
| 4,100,245 | 7/1978 | Horikawa et al. | 524/904 |
| 4,396,566 | 8/1983 | Brinkmann et al. | 264/126 |
| 4,475,477 | 10/1984 | Morse et al. | 427/197 |
| 4,480,581 | 11/1984 | Simmonds, Jr. et al. | 427/197 |

FOREIGN PATENT DOCUMENTS 1091054  10/1960  Fed. Rep. of Germany ...... 264/126

Primary Examiner—Allan M. Lieberman
Attorney, Agent, or Firm—Thomas S. Szatkowski

[57] ABSTRACT

Novel particulate polymeric materials which can be arranged in a predetermined three dimensional pattern in or on a surface, fused and cooled to provide fused, three dimensional polymeric articles. The particulate polymeric materials have the capability to provide a release coating about the fused polymeric article which permits removal of the article from the surface carrying the article.

21 Claims, No Drawings

PARTICULATE POLYMERIC MATERIALS AND METHODS FOR USING PARTICULATE POLYMERIC MATERIALS

BACKGROUND OF THE INVENTION

1. The Field of the Invention

This invention relates to novel, improved, particulate polymeric materials. A principle object of the invention is to provide novel, improved particulate polymeric materials which can be arranged in a predetermined three dimensional pattern, fused and cooled to provide three dimensional polymeric articles. Another object of the invention is to provide a novel, improved process for producing improved three dimensional polymeric articles.

2. The Prior Art

Particulate polymeric materials such as polymeric powders are known in the art and are used to produce three dimensional polymeric articles in known manners. Processes and apparatus suitable for providing polymeric articles by first fusing and then cooling three dimensional patterns or arrays of polymeric powders are disclosed and claimed in commonly assigned U.S. Pat. No. 4,475,477 issued to Morse et al and U.S. Pat. No. 4,480,581 issued to R. C. Simmonds Jr. et al and in commonly assigned U.S. patent application Ser. No. 452,964 filed Dec. 29, 1982 by R. C. Simmonds Jr. et al, now abandoned, and U.S. patent application Ser. No. 452,962 filed Dec. 29, 1982 by R. C. Simmonds et al, now U.S. Pat. No. 4,540,608. Additional details relating to processes or apparatus or articles involving polymeric powders can be found in commonly assigned U.S. patent application Ser. No. 452,963 filed Dec. 29, 1982 by R. C. Simmonds Jr. et al, now U.S. Pat. No. 4,528,710, and in U.S. patent application Ser. No. 557,453 filed Dec. 2, 1983 by R. Elliott et al, now abandoned, and in U.S. patent application Ser. No. 558,057 filed Dec. 5, 1983 by R. Elliott et al now U.S. Pat. No. 4,503,091, and in U.S. patent application Ser. No. 556,270 filed Nov. 30, 1983 by A. Gilbride et al, now U.S. Pat. No. 4,502,411, and in U.S. patent application Ser. No. 556,451 filed Nov. 30, 1983 by A. J. Morse et al, now U.S. Pat. No. 4,520,751. All of the above mentioned U.S. patents and applications are expressly incorporated here in their entirety by reference.

According to the teachings of the above patents and applications, three dimensional polymeric articles are produced by depositing or otherwise arranging a three dimensional pattern of a polymeric powder on the surface of a preferably movable receiving belt or web. The pattern of polymeric powder is then transported to a heating station where the powder is fused and the fused mass is then transported to a cooling station where another substrate may be pressed on or otherwise joined to the surface of the mass. At the cooling station, the fused, three dimensional polymeric article is lifted or otherwise removed from the receiving belt by suitable transfer means. Polymeric powders suitable for use in the processes and apparatus disclosed and claimed in the above mentioned U.S. patents and applications include polyolefins, polyesters, polyamides and polyurethanes among others.

In the above mentioned U.S. patents and applications, a release agent is applied to the receiving belt or surface carrying the pattern of polymeric powder. The release agent is primarily required in order to effectively prevent adhesion of the surface of the fused mass to the surface of the receiving belt. Additionally the release agent is required so that the three dimensional mass can be effectively removed from the belt surface usually near or above the Vicat temperature of the polymeric powder. While release agents perform an important function in the prior art processes and apparatus for producing polymeric articles comprising polymeric powders, the use of such release agents presents undesirable operational features. First, the application of release agent to the belt is time consuming and waste can result if the release agent is not applied properly. Moreover, the release agent can stain the final polymeric article. Additionally removal of the release agent from the surface of the polymeric article is oftentimes required if the surface of the article is to be coated such as with paints or adhesives or the like. The invention is directed to the problems arising out of use of release agents in providing polymeric articles from polymeric powders and provides a novel, simple but especially effective solution for those problems.

BRIEF SUMMARY OF THE INVENTION

The novel, improved particulate polymeric materials of the invention include a heat fusible, flowable, substantial non-agglomerating particulate polymeric material having a coating comprising a release agent carried on the surface of the particulate polymeric material. The Preferred particulate polymeric materials of the invention comprise a heat fusible, flowable, non-agglomerating particulate polymeric material or powder carrying on its surface, a coating believed to be a monomolecular layer of a substantially uniform blend or mixture of an antistatic agent and a release agent with an anti-agglomerating agent substantially uniformly dispersed in and/or carried on the layer. The polymeric powders of the invention are produced by mixing the polymeric powder with a release agent preferably together with an antistatic agent and an anti-agglomerating or dryer or flow promoter agent to coat a substantially uniform blend of the agents about the surface of the polymeric powder. Three dimensional polymeric articles are produced by arranging a predetermined pattern of the novel polymeric powder in or on a surface without applying a release agent to the surface. When heated, the polymeric powder melts and fuses together and a release coating is provided on the surface of the fused mass which permits removal of the fused mass from the surface as a dimensionally stable polymeric article. The especially preferred polymeric powders of the invention permit removal of the fused mass from the surface while the average temperature of the fused mass is near or above the Vicat temperature of the polymeric powder. In another preferred embodiment of the invention, the article can be coated with paints and/or adhesives without further treatment. For the purposes of this invention, the Vicat temperature of the polymeric powder is measured by the ASTM D1525-76 Rate B Standard Test Method For Vicat Softening Temperature of Plastics.

DESCRIPTION OF THE PREFERRED EMBODIMENTS

The best mode presently contemplated for practicing the present invention involves the use of the novel polymeric powders to produce polymeric reinforcing or stiffening elements for footwear such as counters, box toes or the like. The preferred polymeric powders for footwear stiffener reinforcing elements are ionomeric polyolefins particularly those of the type described in detail in U.S. Pat. No. 3,264,272 issued to R. W. Rees. Essentially the polymers disclosed and claimed in U.S. Pat. No. 3,264,272 are ionomeric copolymers comprising ethylene and polymerizable monomers containing carboxylic acids. These preferred ionomeric polyolefin materials are sold commercially by E. I. DuPont de Nemours & Co. under the registered trademark SURLYN. Other polymeric powders useful in preparing footwear stiffener reinforcing elements are nonionomeric polyolefins such as polyethylene, polypropylene and the like and copolymers of olefins with such monomers as vinyl acetate, ethyl acrylate and the like. Ethylene copolymers of the type described in U.S. Pat. No. 3,239,370 issued to Thomson et al are also suitable in the practice of the invention as are mixtures of polymers and copolymers mentioned before. The particle size of the polymeric powder for footwear stiffener reinforcing elements can vary and suitable particle sizes include those which will pass through about a 10 to about a 120 mesh screen. Particularly preferred particle sizes for the SURLYN ionomeric olefin copolymer powders are those which will pass through a 20 to about a 40 mesh screen.

In accordance with the preferred embodiment of the invention, the polymeric powder is mixed with a blend of an antistatic agent, a silicone release agent and an anti-agglomeration agent. Antistatic agents (antistats) are known to the art and their performance characteristics are well defined. Most polymeric materials have good electrical insulating properties but because of their non-conductivity they easily acquire but do not readily lose static electrical charges. The preferred antistatic agents used in the practice of the present invention are external antistats which operate primarily by conductance. They include dissolved ions and are present on the surface of the polymeric powder and are hygroscopic. Accordingly they provide a conductive path consisting of a thin layer of water which the antistat absorbs from the atmosphere onto the surface of the polymeric powder. The conductivity of the absorbed water is significantly increased by the presence of the dissolved ions thereby increasing the overall effectiveness of the antistat. Preferred external antistats suitable in the practice of the present invention include catonic compounds, anionic compounds and non-ionic compounds. Cationic antistat compounds include quarternary ammonium or phosphorium salts in which the quarternary group may also form part of a ring (e.g. imidizoline); the anion may be chloride or meta-sulfate for example. Anionic antistat compounds include alkyl sulfates, sulphonates, phosphates, dithiocarbamates and carboxylates; the cations are usually alkali metals or alkaline earth metals. Non-ionic antistat compounds include polyethylene glycol esters or ethers, fatty acid esters or ethanolamides, mono- and diglycerides and hydroxyethylated fatty amines. Especially preferred antistats in the practice of the present invention are quarternary ammonium salts. Internal antistats or electrical fields or other techniques can also reduce the static charges on polymeric materials of the invention but external antistats present the most inexpensive, effective and convenient manner for minimizing the effects of static charges in the polymeric powders of the invention.

The amount of external antistatic agent used in the practice of the present invention will depend primarily on the particle size of the polymeric powder. In the preferred practice of the present invention, effective amounts of antistatic agent range from about 0.01 to about 0.5 percent by weight of antistatic agent based on the total weight of particulate polymeric material and the antistatic, silicone release and flow promoter agents. An especially preferred range of amounts of the preferred antistatic agents is between about 0.05 to about 0.2 percent by weight antistatic agent based on the total weight of the ingredients of the polymeric powders of the invention.

Preferred release agents in the practice of the present invention are silicone mold release agents which are preferably organopolysiloxanes having low surface tension so that the agent can sufficiently wet surfaces to provide release of molded polymeric articles from surfaces carrying the articles. The especially preferred release agents in the practice of the present invention are "paintable" silicones. Paintable silicone release agents need not be removed or are more readily removed from the surface of the fused article in order to effectively apply paints or adhesives to the surface. Obviously if removal of the release agent from the surface of the fused article is not contemplated or needed, non-paintable silicone release agents can be suitably employed. Preferred silicone release agents are at least partially miscible in the antistatic agent at least at the temperature of fusion. Paintable alkyl and/or aryl polysiloxane release agents are especially preferred in the practice of the present invention and such release agents are commercially available and known to the art. Effective amounts of the especially preferred mold release agents can range between about 0.01 to about 0.5 percent by weight release agent based on the total weight of the polymeric powder and the antistatic, release and anti-agglomeration agents. An especially preferred range of amounts of release agent is from about 0.05 to about 0.2 percent by weight. The ratio of the respective amounts of the preferred antistatic agent to the preferred release agents can vary but the most effective ratios are between about 2:1 to 2:3.

Anti-agglomeration (anti-caking, anti-bridging) or dryer or flow promoter agents useful in the practice of the invention are those which can be substantially uniformly dispersed in or carried by the monomolecular layer of the antistatic and release agent mixture coating the polymeric powder. Essentially the function assigned the anti-agglomeration agent is to hold the individual polymer particles apart and prevent intimate contact between the particles and to "lubricate" the particle surface to in effect provide "bearings" upon which the individual particles can move relative to each other. The anti-agglomeration agents useful in the practice of the invention are those which will at least soften and preferably melt at or below the temperature for fusing the polymeric powder. Preferred anti-agglomeration agents are organo metallic soaps, fatty acids and waxes which will melt at or below the fusing temperature. Metallic stearates particularly zinc or magnesium stearates are the especially preferred anti-agglomeration agents.

Effective amounts of the preferred metallic stearate anti-agglomeration agents can range between about 0.05 to about 1 percent by weight of the agent based on the total weight of powder and antistatic, release and anti-agglomeration agents. Especially preferred amounts for the preferred zinc or magnesium stearate range from about 0.2 to about 0.6 percent by weight.

The use of anti-agglomeration agents is definitely preferred in the practice of the invention. However, the agents need not be used if suitable flow or anti-agglomeration performance characteristics can be achieved in other manners such as by way of specialized processing techniques and/or specialized materials which eliminate the need for anti-agglomeration agents.

According to my present belief, the preferred anti-agglomeration agent is substantially uniformly dispersed in at least one of the agents in the mixture of antistatic agent and silicone release agent coating the polymeric powder during fusion of the powder. At the fusion temperature, the preferred anti-agglomeration agent softens or melts and is miscible or otherwise dispersed in the antistatic agent and/or silicone release agent to provide a substantially uniform dispersion of antistatic agent, silicone release agent and anti-agglomeration agent which is distributed in continuous fashion about the surface of the polymer particle. As fusion proceeds, some of the dispersion may be entrapped internally at the interstices of the fused particles but a sufficient portion of the dispersion is exuded to the surface of the fused molten mass to provide a release coating about the surface of the fused mass. On cooling the fused mass, the release coating coalesces or coagulates to form a thin, gel or wax-like coating continuously distributed about the surface of the fused mass. The gel or wax-like character of the coating assures and enhances release of the fused mass as a dimensionally stable polymeric article from a surface carrying the mass preferably while the average temperature of the mass is near or above the Vicat temperature of the polymeric powder. If a paintable release agent is employed, the coating provided by the coalesced residue of the dispersion of the agents need not be removed from the surface. Instead, hot melt adhesives for example, can be applied directly to the surface of the polymeric article for bonding the surface to the surface of another substrate.

Depending upon the end use of the polymeric article, pigments and/or fillers and/or other such additives can be included in the polymeric powder and/or mixed with the polymeric powder.

The invention as well as manners for making and using the invention will be more fully appreciated from the following non-limiting Examples presented for the purpose of illustrating the invention

EXAMPLE 1

The following ingredients were charged to a Patterson Kelly Twin Shell Dry Blender (Model 20) with a beater bar:

| | |
|---|---|
| SURLYN powder[1.] | 460 pounds |
| Antistatic Agent[2.] | 276 grams (28.8 mls.) |
| Release Agent[3.] | 138 grams (13.9 mls.) |

The ingredients were mixed at room temperature for 25 minutes at a shell speed of about 25 rpm and at a beater speed of 2160 rpm. The mixer was stopped and 828 grams of zinc stearate [4.] were then added to the ingredients and mixing was resumed for 5 minutes at the same speeds.

1. The SURLYN powder was DUPONT 8941 which was sold by E. I. DuPont de Nemours and Company and which was ground to a 25 mesh particle size.

2. The antistatic agent was Witco AL-22 which is a modified quarternary ammonium chloride derivative and sold by Argus Chemical Divison.

3. The release agent was Dow Corning 230 Fluid which is an alkylmethyl polysiloxane having a Standard Viscosity at 25° C. of from about 1200 to about 1600 centistokes and sold by Dow Corning Corporation. Dow Corning 230 Fluid is a paintable release agent.

4. The Zinc Stearate was PETRAC ZN-44HS a zinc stearate having a melting point of from about 115° C. to about 125° C. and sold by Petrochemicals Company Incorporated.

The polymeric powder product comprised discrete non-agglomerated powder particles and had satisfactory cold flow (anti-caking and anti-bridging) properties.

EXAMPLE 2

Example 1 was repeated but 828 grams of magnesium stearate were substituted for the zinc stearate. The magnesium stearate used was PETRAC mg-20 N.F. having a softening point of about 140° C. and sold by Petrochemicals Company Incorporated.

While Dow Corning 230 Fluid is used as the silicone release agent in Examples 1 and 2, other silicone release agents such as Dow Corning 200 Fluid and Dow Corning 203 Fluid for example are suitable silicone release agents. Dow Corning 200 is a polydimethylsiloxane while Dow Corning 203 is an alkylaryl polysiloxane. Dow Corning 203 is paintable but Dow Corning 200 is not.

EXAMPLE 3

The polymeric powders of Examples 1 and 2 were used in production scale runs on multi-station apparatus as described in U.S. Pat. No. 4,480,581 to provide a plurality of reinforcing elements for shoe uppers. In each run, a three dimensional pattern of the powder was deposited onto the annular receiving belt at a powder deposition station including a stencil assembly in the manner described in U.S. Pat. No. 4,480,581. The annular receiving belt was rotated to an arcuate heating station as described in the patent where the polymeric powder pattern was fused at a temperature of about 480° F. to about 500° F. for 25 seconds. The fused mass was then moved to a join and cool station as described in the patent where a shoe upper substrate was pressed against the mass by transfer means causing the fused mass to press against a cooling plate arranged beneath the receiving belt. During the runs, the temperature of the cooling or chill plate was between about 90° F. to about 110° F. and the mass was pressed against the plate for about 2.5 seconds. Transfer means removed the reinforced shoe upper from the receiving belt as described in the patent. Average temperature measurements of the fused mass were made substantially immediately (within about one second) after removal of the mass from the surface of the belt by the transfer means. The average temperature of the surface of the fused element removed from the belt was measured using a Wahl HEAT SPY, infra-red thermometer, Model DHS-16 sold by Wahl Instruments Incorporated. Average temperature measurements of the surface of the reinforcing element ranged between 225° F. and 260° F. which is about 80° F. to about 115° F. above the Vicat temperature of the SURLYN polymeric powder providing the reinforcing element.

In the runs, reinforced shoe uppers were produced at the rate of 360 pairs per hour. No release agent was applied to the receiving belt at any time during the run and the reinforcing elements were readily removed from the belt without any interruption throughout the operation. The reinforcing elements which were about 0.035 inches thick exhibited excellent physical properties, and particularly an excellent combination of tear strength and elongation properties. Also hot melt or latex adhesives could be applied directly to the surface of the reinforcing element of the shoe upper to effectively assemble the shoe upper without any cleaning or other conditioning of the surface.

While the preferred embodiment of the invention involves the preparation of three dimensional reinforcing agents for shoe stiffener materials as described, the polymeric powders of this invention can be use to provide various polymeric articles in various ways. For example, the polymeric powders can be used to provide various reinforcing or stiffening elements for apparel such as shirts, sports clothing or for sports equipment such as pads, gloves, caps with visors or the like. Accordingly the polymeric powders can provide a wide variety of three dimensional polymeric articles having various sizes, shapes and end uses.

The preferred novel polymeric powders presented to the art by the present invention have the capability to provide three dimensional fused polymeric articles which can be removed from a surface carrying the article as dimensionally stable articles while the average temperature of the fused mass is near or above the Vicat temperature of the polymeric material. Dimensionally stable means that although the article has not completely solidified it will not undergo significant distortion such as elongation or tearing and can retain substantially the same dimensional size and shape during and after removal until complete solidification. Removal of the polymeric article from the surface near or above the Vicat temperature is a definitely preferred embodiment of the present invention. The feature provides obvious advantages in high speed, commercial production processes for polymeric articles. However it should be understood that processes involving removal of the polymeric article from the support below the Vicat temperature are contemplated and included within the spirit and scope of the inventions defined in the appended claims.

I claim:

1. A heat fusible, flowable, particulate material for providing fused polymeric articles which comprises:
   (a) a fusible polymeric component in the form of a powder comprising a nonionomeric polyolefin, an ionomeric polyolefin or mixtures of these;
   (b) a silicone release agent in an amount from about 0.01 to about 0.5 percent by weight based upon the total weight of particulate material;
   (c) an antistatic agent in an amount from about 0.01 to about 0.5 percent by weight based on the total weight of particulate material;
   (d) an antiagglomerating agent which will soften at or below the temperature for fusing the polymer powder comprising a metallic stearate in an amount effective to hold individual polymer particles apart and prevent intimate contact between the surfaces of said particles;
   whereby the material can be heated to a temperature for fusing the material to provide a fused polymeric mass having a release coating on the surface of the mass which permits removal of the mass from a surface carrying the mass.

2. A material of claim 1 wherein the particle size of the particulate material is between about 10 to about 120 mesh.

3. A material of claim 1 wherein the particle size of the particulate material is between about 20 to about 40 mesh.

4. A material of claim 1 wherein the fusible polymeric component comprises an ionomeric copolymer of ethylene and polymerizable monomers containing carboxylic acids.

5. A material of claim 1 wherein the antistatic agent comprises a quarternary ammonium salt.

6. A material of claim 1 wherein the antistatic agent is present in an amount such that ratio of antistatic agent to release agent is between about 2:1 to about 2:3.

7. A material of claim 1 wherein the antiagglomerating agent is present in an amount from about 0.05 to about 1 percent by weight based upon the total weight of particulate material.

8. A material of claim 1 wherein the silicone release agent comprises an organo polysiloxane.

9. A material of claim 1 wherein the silicon release agent comprises a paintable alkyl and/or aryl siloxane.

10. A material of claim 1 wherein the metallic stearate comprises zinc stearate or magnesium stearate.

11. A material of claim 1 wherein the fusible polymeric component comprises an ionomeric or nonionomeric polymer of ethylene; the silicone release agent comprises an alkyl and/or aryl siloxane; the antistatic agent comprises a quarternary anmmonium salt and the antiagglomerating agent comprises zinc stearate or magnesium stearate and is present in an amount from about 0.05 to about 1.0 percent by weight based on the total weight of particulate material.

12. A material of claim 1 wherein a substantially uniform mixture of antistatic agent, silicone release agent and antiagglomerating agent comprises a coating on the surface of the polymeric component.

13. A process for producing fused polymeric articles comprising the steps of:
(a) providing a three dimensional pattern of a fusible particulate polymeric material on a surface, said particulate polymeric material comprising
    (i) a fusible polymeric component in the form of a powder comprising a nonionomeric polyolefin, an ionomeric polyolefin or mixture of these;
    (ii) a silicone release agent in an amount from about 0.01 to 0.5 percent by weight based upon the total weight of particulate polymeric material;
    (iii) an antistatic agent in an amount from about 0.01 to about 0.5 percent by weight based on the total weight of particulate polymeric material; and
    (iv) an antiagglomerating agent which will soften at or below the temperature for fusing the polymer powder comprising a metallic stearate in an amount effective to hold individual particles apart and prevent intimate contact between the surfaces of said particles;
(b) heating said three dimensional pattern to provide a fused mass of said particulate polymeric material;
(c) cooling said fused mass; and
(d) removing said mass from said surface as a dimensionally stable, three dimensional polymeric article.

14. A process of claim 13 wherein said mass is removed from said surface while the average temperature of the mass is near or about the Vicat temperature of the particulate polymeric material.

15. A process of claim 13 wherein said fusible polymeric component comprises a ionomeric copolymer of ethylene and polymerizable monomers containing carboxylic acids.

16. A process of claim 13 wherein said antistatic agent comprises a quarternary ammonium salt.

17. A process of claim 13 wherein the metallic stearate comprises zinc stearate or magnesium stearate.

18. A process of claim 13 wherein said antiagglomerating agent is present in an amount from about 0.05 to about 1 percent by weight based on the total weight of particulate polymeric material.

19. A process of claim 13 wherein said silicone release agent comprises a paintable alkyl and/or aryl siloxane.

20. A process of claim 13 wherein the fusible polymeric component comprises an ionomeric or nonionomeric polymer of ethylene, the silicone release agent comprises an alkyl and/or aryl siloxane; the antistatic agent comprises a quarternary ammonium salt and the antiagglomerating agent comprises zinc stearate or magnesium stearate and is present in an amount from about 0.05 to about 1.0 percent by weight based upon the total weight of the particulate polymeric material.

21. A method for producing a heat fusible, flowable, particulate polymeric material which comprises the steps of:
(a) grinding a fusible polymeric component which comprises a nonionomeric polyolefin, an ionomeric polyolefin or mixtures of these to a particle size between about 20 to about 40 mesh;
(b) mixing the polymeric component with
  (i) a silicone release agent in an amount from about 0.01 to about 0.5 percent by weight of particulate material based on the total weight of particulate material;
  (ii) an antistatic agent in an amount from about 0.01 to about 0.5 percent by weight based on the total weight of particulate material; and
  (iii) a metallic stearate antiagglomerating agent in an amount from about 0.05 to about 1.0 percent by weight based upon the total weight of the particulate material,
so as to coat a substantially uniform blend of the agent about the surface of the polymeric component.

* * * * *